June 2, 1931.   C. W. EYRES   1,807,975
BUILT-IN GRINDER AND ENSILAGE CUTTING MACHINE
Filed Aug. 31, 1928
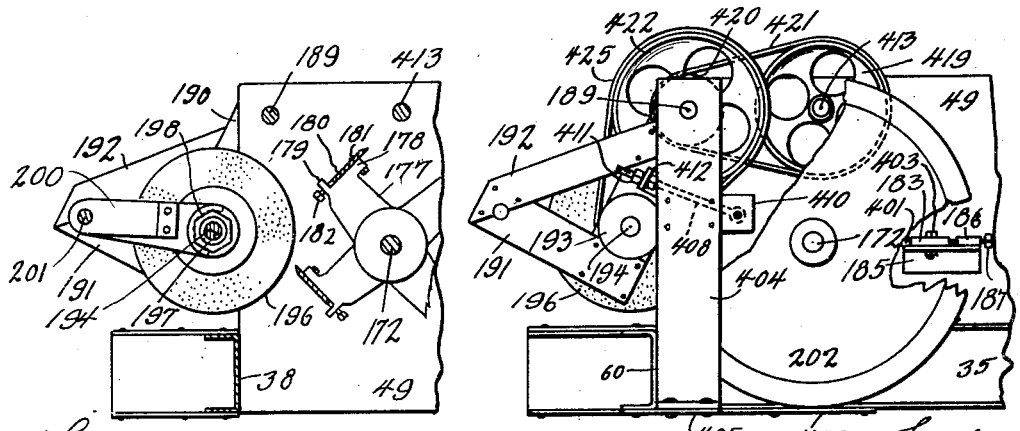
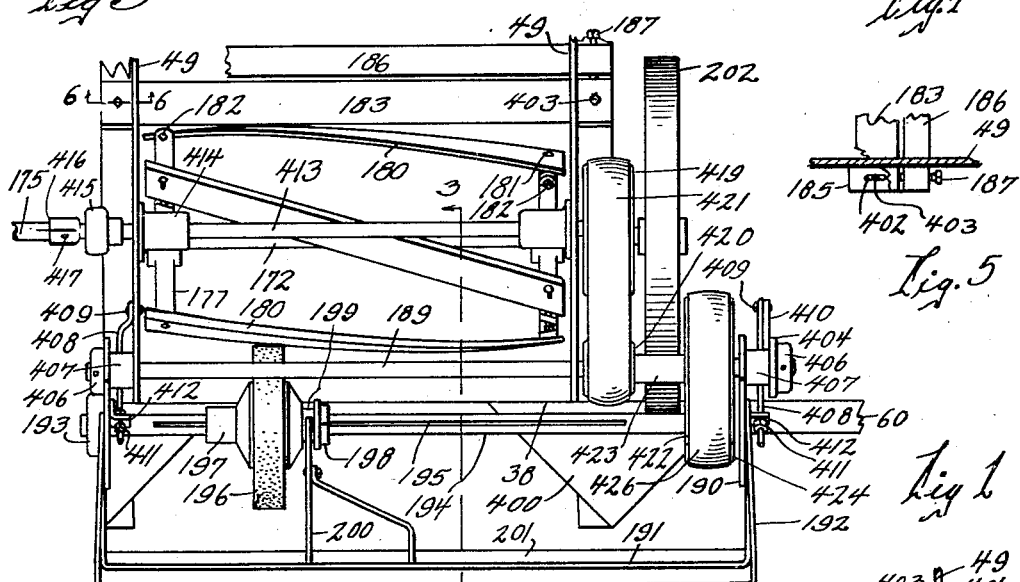
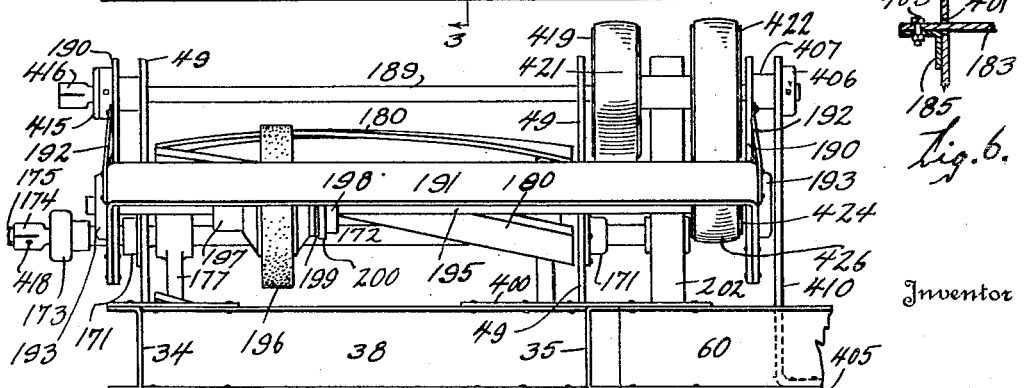
Inventor
Charles W. Eyres
By Lynn H. Latta  Attorney Patented June 2, 1931

1,807,975

UNITED STATES PATENT OFFICE

CHARLES W. EYRES, OF LE MARS, IOWA

BUILT-IN GRINDER AND ENSILAGE CUTTING MACHINE

Application filed August 31, 1928. Serial No. 303,335.

My invention relates to grinders and has for its object to provide a grinder for sharpening knives of an ensilage cutter of the type having a cylinder cutter.

More particularly, it is my object to provide a grinder which is permanently attached to the ensilage machine and built into the ensilage machine so as to form a part of the machine.

The advantages of a built-in grinder are several. In the first place, with a built-in grinder, it is unnecessary to remove the blades of the cutter. In the second place, it is possible in a built-in grinder to utilize the cylinder itself as a support and guide for holding the blades in the proper position during the grinding operation and thus a more accurate job of grinding may be obtained in a shorter period of time, than is required in the practice of the old method of removing the blades from the cutter.

A further object of my invention is to arrange the parts so that the grinder will not interfere with the operation of the cutter when the machine is in operation.

A further object of my invention is to provide a built-in grinder in combination with a cutter in a machine in which the same power unit may be employed to drive separately either the grinder or the cutter.

A further object is to provide an arrangement in which the power drive shaft may be readily shifted from the grinder to the cutter.

A further object of my invention is to provide a machine including a cutter and a grinder in combination, and wherein the cutter includes a fly wheel, adapted to be employed for holding the cylinder in position during grinding operation.

A further object of my invention is to provide a simple and novel carriage for the grinding wheel including means for adjusting the wheel both radially and longitudinally relative to the cutter cylinder.

A still further object is to provide a step-up drive from the power shaft to the grinder wheel shaft, parts of said drive serving the double function of supporting the grinder wheel carriage.

A fundamental object of the present invention is to eliminate the necessity of adjustment of the knives after grinding and this is accomplished by employing together with the built-in grinder a sheer plate which is adjustable toward the knives, whereby the plate may be adjusted in place of the knives after the grinding operation. It will be understood in this respect that the hardest task and the one which requires the most exacting attention in connection with sharpening a cutter is that of adjusting the blades after the grinding has been done.

With these and other objects in view, my invention consists in the construction arrangement and combination of the various parts of my device, whereby the objects contemplated are attained, as hereinafter more fully set forth, pointed out in my claims, and illustrated in the accompanying drawings, in which:

Fig. 1 is a plan view of a portion of an ensilage cutter with my invention embodied therein.

Fig. 2 is an end elevation of the same.

Fig. 3 is a sectional view taken on the line 3—3 of Fig. 1.

Fig. 4 is a side elevation of the device, a portion of the fly wheel being broken away to better illustrate the construction.

Fig. 5 is a sectional view showing the adjustable sheer plate bracket in plan.

Fig. 6 is a sectional view taken on the line 6—6 of Fig. 1.

The grinding unit of the present application is identical in many respects with the grinding unit in my co-pending application, Serial Number 179,876, filed Mar. 31, 1927.

In the accompanying drawings, I have illustrated portions of the machine of my co-pending application, Serial Number 179,876, and for convenience in referring to those parts in identifying them with the disclosure in the co-pending application, I have used the same terminology and the same reference characters in the present application to refer to said parts. In Fig. 1 of the co-pending application, Serial Number 179,876, is shown a plan view of the entire machine, of which the present invention is a part.

On page 6 of the specification of the co-pending application is described the transverse frame of the ensilage cutter, including the parallel, transverse rails 34 and 35. A transverse member 38 connects the rails 34 and 35 at the grinder end of the machine, being shown in Fig. 12 of the drawings of the co-pending application.

The auxiliary frame for supporting a travel wheel in an auxiliary position including a frame member 60 is shown in Figs. 1 and 2 of the drawings of the co-pending application. The member 60 is secured to the rail 35 by means of gusset plates 400 (not numbered in the copending application). It may be noted at this point that the numerals above 400 in the present application do not correspond to any reference characters in the co-pending application.

The cutter cylinder is mounted on a shaft 172, which is journalled in bearings 171, secured to vertical plates 49. The plates 49 are secured to the inner sides of the rails 34 and 35, respectively, and extend thereabove to form the sides of a trough through which the material passes during the cutting operation.

The universal joint 173 connects the shaft 172 to a drive shaft 175. A squared sleeve 174 allows the shaft 175 to be removed for a purpose which will hereinafter be more fully set forth.

The cutter is an ordinary construction including the spiders 177, having the circumferential and radial fingers 178 and 179 respectively, and the blades 180, adjustably secured to the fingers 178 by means of bolts 181 and adjusted by means of set screws 182.

The cutter cylinder cooperates with an adjustable sheer plate 183, which is adjustably mounted on a pair of brackets 185, secured to the outer sides of the plates 49. Sheer plate 183 extends through slots 401 in the plates 49. The sheer plate 183 has a slotted connection with the brackets 185, such as to allow the plate to be adjusted laterally. This slotted connection includes slots 402 in the brackets and bolts 403 in the sheer plate extending through the slots. A fixed plate 186 is secured to the brackets 185 and provided with a set screw 187, which holds the adjustment of the movable sheer plate 183.

The upper surface of the sheer plate is exactly horizontal with the axis of the cylinder. It will be noted that the knives of the cylinder project forwardly from the radius to which they are perpendicular and consequently that the bevelled edge on the knives will be within the periphery of movement of their cutting edges.

The purpose of the adjustable feature of the sheer plate is to permit the sheer plate to take up the space between the knives and the sheer plate caused by grinding away the knives. As will later appear, the knives are ground exactly true with their cutting edges lying within the same cylindrical surface, this being automatically accomplished by the grinding wheel. Consequently the only care that need be taken in adjusting the cutter after grinding will be to see that the sheer plate is the same distance from the cutting edge of a particular knife at either end of said knife and after the distance at these two points has been set on one blade, the same spacing between the remainder of the edge of said blade and of the remaining blades will be assured.

The end of the shaft 172 opposite the drive connection is provided with the fly wheel 202.

An idler shaft 189 is mounted in the plates 49 and in an upright 404, secured by means of a gusset plate 405 to the frame member 60. Collars 406 secure the shaft 189 against longitudinal movement, the shaft being a dead shaft and not intended to rotate.

The shaft 189 is used for the double purpose of attaching the grinder frame to the machine and of supporting an intermediate portion of the drive between the power plant and the grinder.

The grinder frame comprises the arms 190, a yoke 191, connecting the arms 190 and braces 192, forming at each side of the frame a triangular construction.

It will now be noted that the grinder frame is swingingly mounted upon the shaft 189, being spaced and held against longitudinal movement of the shaft by washers or collars 407.

The grinder wheel is mounted on a wheel shaft 194, journalled in ball bearings 193, supported by the grinder frame. The wheel shaft 194 is provided with a key slot 195, by means of which the wheel 196 is slidably but non-rotatably mounted on the shaft. The wheel includes a carriage sleeve 197, to which the wheel is secured in the usual manner by a nut 198, the sleeve being provided with an annular slot 199 to receive the forked end of a shifting lever 200. Shifting lever 200 is journalled at its other end for sliding movement upon a shaft 201, supported by the grinder frame. The shaft 201 serves merely to support the shifting lever in proper relation to the grinding wheel and the shifting lever acts as a means for manually engaging the grinding wheel for shifting it from one end to the other of the cutter cylinder.

As the grinder wheel is shifted thus longitudinally of the cutter cylinder, it will be necessary that the blade which is being ground be shifted circumferentially in order that the edge of the blade may remain in contact with the grinding wheel in the same relation thereto.

This is accomplished by utilizing the fly wheel 202 as a hand wheel during the grinding of the cylinder. It will be remembered in this connection that in the present invention the cylinder does not rotate during the grinding operation.

The advantage in grinding a single blade at a time with the cylinder stationary results from the fact that it is possible to grind the blade with a relief or under-cut, i. e., at an angle wherein the bevelled face of the blade recedes inwardly in a radial direction from the cutting edge of the blade. Thus the original bevel of the blade may be maintained.

In order to do this, it is necessary to swing the wheel radially relative to the cylinder in order to allow the edge of the blade to pass the wheel. In other words, before the wheel can be brought into proper engagement with the blade, it is necessary to swing the wheel away from the blade, to rotate the blade until the edge of the blade has passed the closest portion of the wheel and to then swing the wheel again toward the blade to bring it into contact with the edge of the blade. It will be understood that this is essential only when the blades are being cut in relief. For finishing, a narrow bevel is placed on the edges which coincides with the surface of a cylinder and this, of course, may be accomplished by setting the wheel rigidly in position and grinding all four blades without disturbing said position.

The method of swinging the wheel away from the cylinder is thought to be obvious from the swinging construction of the grinder frame.

In order to hold the grinder frame in any particular adjusted position, I provide a pair of adjusting screws 408, pivoted at 409 to the plate 49 and to a bracket 410, respectively, and each provided with a pair of round faced nuts 411, engaging on either side of brackets 412, secured to the grinder frame. The bracket 400 is secured to the upright 404 (Figs. 1 and 4).

By rotating the nuts 411, the radial position of the grinder frame relative to the cutter cylinder may be adjusted.

Instead of driving the grinder from the cutter cylinder shaft as in the machine of my co-pending application, the grinder is provided with means for independent drive, whereby it may be coupled directly to the same power plant with which the cylinder is connected. In order to obtain this result, I provide a power transmitting shaft 413, mounted in bearings 414 on the plates 49 directly above the cutter shaft 172 and as close to the shaft 172 as is possible.

A universal joint 415, provided with a sleeve 416, to receive the shaft 175, connects the shaft 413 to the same source of power as drives the shaft 172. It will be remembered that the connection of the shaft 175 with the power plant as disclosed in my co-pending application, is made through the medium of another universal joint, thus allowing considerable angular shift of the drive shaft 175 without interfering with the drive connection between the power plant and either the cutter cylinder or the transmitting shaft 413.

Removal of the pin 417 or 418 from the sleeve 416 or 174, respectively, allows the shaft 175 to be slid longitudinally to remove it from the respective universal joint. The shaft 413 drives the shaft 189 through the medium of a drive pulley 419, a smaller pulley 420 on the shaft 189 and a belt 421 connecting the two. A chain drive might be substituted with equal effect for the belt drive just considered.

The wheel shaft 194 is driven from the idler shaft 189 by means of a pulley 422, which is formed integrally with the pulley 420 through the medium of a sleeve 423, journalled upon the shaft 189. A smaller pulley 424 on the shaft 194 is connected to the pulley 422 by means of a belt 425.

The ratios of the pulleys is such as to step up the speed of the shaft 413 to the shaft 194 several times. It may now be noted that by removing one of the collars 406, that the shaft 189 may be removed from the cutter frame, allowing the entire grinder frame to be removed from the machine. This operation will be needed whenever it is desired to change grinder wheels and the wheels will have to be replaced periodically.

The advantage of the separate drive to the grinder has already been enlarged upon but may be briefly repeated at this point. The separate drive makes it possible to relief cut the blades without removing them from the grinder cylinder.

It will be understood that although the present invention has been described in connection with the ensilage cutter of my co-pending application, Serial Number 179,876, that this grinder may be equally well applied to any ensilage cutter employing a cylindrical cutter unit. Some modification would, of course, be necessary in many cases, mainly in the installation of a sheer plate but the salient features of construction, would remain the same in each case.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In combination with an ensilage cutter having a drive shaft, a cutter cylinder substantially coaxial with said drive shaft, a fly wheel on the shaft of the cutter cylinder, a frame in which the cylinder is journalled, an idler shaft in said frame parallel to the cylinder shaft, a grinder frame hinged upon said idler shaft for swinging movement radially of the cylinder, a wheel shaft journalled in said grinder frame in a position parallel to the cylinder shaft, a grinder wheel slidably and non-rotatably mounted on said wheel shaft, a power transmitting shaft positioned near the cylinder and parallel to the cylinder shaft, means including a universal joint for coupling the drive shaft to either the power transmitting shaft or the cylinder shaft and drive means connecting the power transmitting shaft with the idler shaft and the idler shaft with the wheel shaft respectively, the fly wheel being disposed at the opposite end of the cylinder from the drive shaft connection.

2. A grinder assembly for an ensilage cutter including a cylinder shaft, a cutter cylinder mounted on said shaft comprising an idler shaft mounted above the axis of the cylinder and parallel thereto, a grinder frame hinged upon said idler shaft for swinging movement radially of the cylinder, said grinder frame normally projecting downwardly and away from the cylinder, whereby it will tend to swing under its own weight toward the cylinder, a wheel shaft journalled in said frame and parallel to the cylinder shaft, a grinder wheel slidably and non-rotatably mounted on said wheel shaft and drive means connecting the idler shaft and the wheel shaft.

3. A grinder assembly for an ensilage cutter including a cylinder shaft, a cutter cylinder mounted on said shaft comprising an idler shaft mounted above the axis of the cylinder and parallel thereto, a grinder frame hinged upon said idler shaft for swinging movement radially of the cylinder, said grinder frame normally projecting downwardly and away from the cylinder, whereby it will tend to swing under its own weight toward the cylinder, a wheel shaft journalled in said frame and parallel to the cylinder shaft, a grinder wheel slidably and non-rotatably mounted on said wheel shaft, drive means connecting the idler shaft and the wheel shaft, a frame in which the idler shaft is journalled, a swinging link pivoted to one of said frames and a screw threaded adjustment connecting said link with the other of said frames.

4. A grinder assembly for an ensilage cutter including a cylinder shaft, a cutter cylinder mounted on said shaft comprising an idler shaft mounted above the axis of the cylinder and parallel thereto, a grinder frame hinged upon said idler shaft for swinging movement radially of the cylinder, said grinder frame normally projecting downwardly and away from the cylinder, whereby it will tend to swing under its own weight toward the cylinder, a wheel shaft journalled in said frame and parallel to the cylinder shaft, a grinder wheel slidably and non-rotatably mounted on said wheel shaft, drive means connecting the idler shaft and the wheel shaft, a channeled collar on the grinder wheel, a guide shaft secured in the grinder frame and a control handle slidably mounted on said guide shaft and provided with a fork engaging said collar.

Signed this 27 day of August, 1928, in the county of Woodbury and State of Iowa.

CHARLES W. EYRES.